Figure 1:
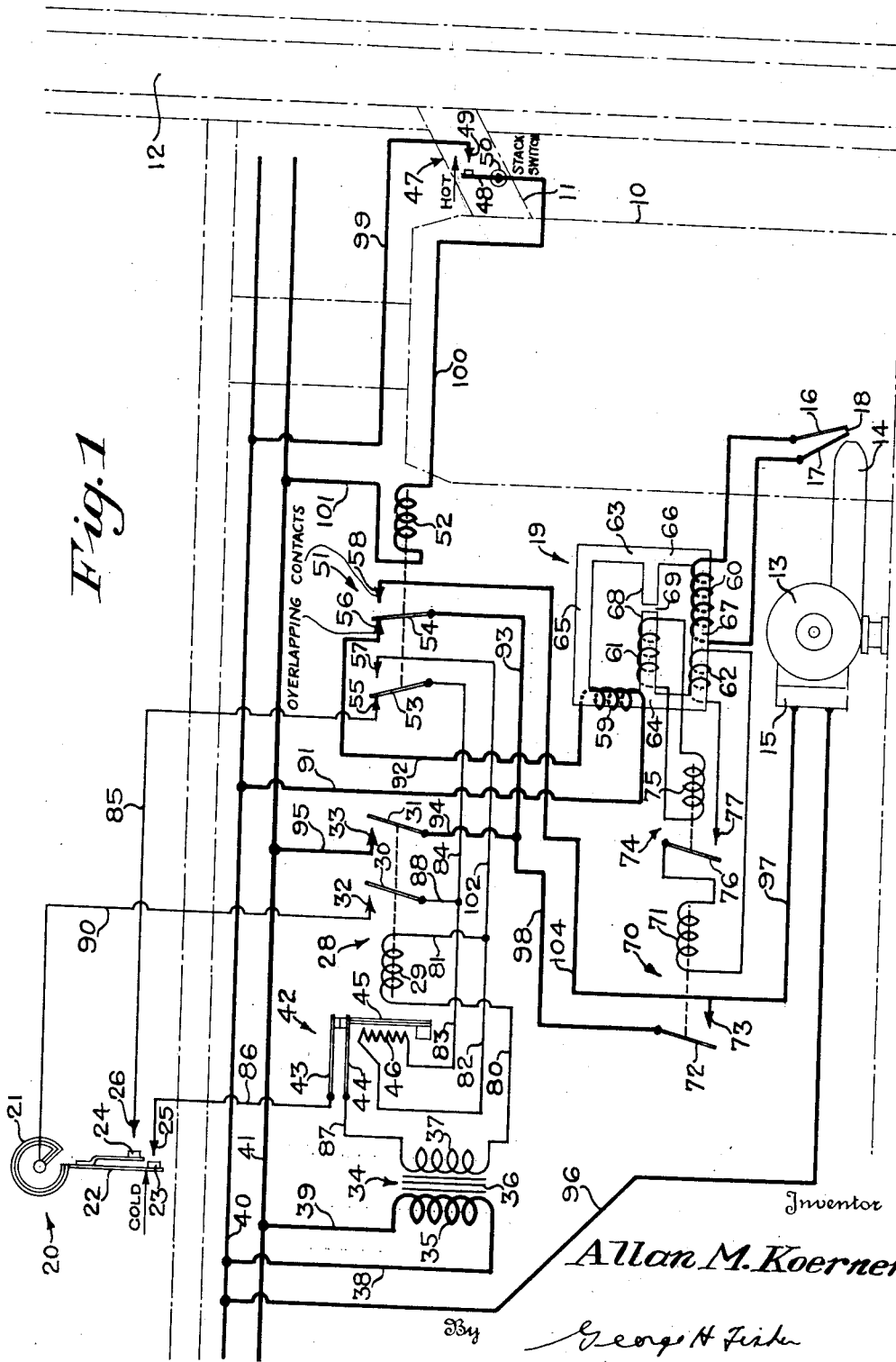

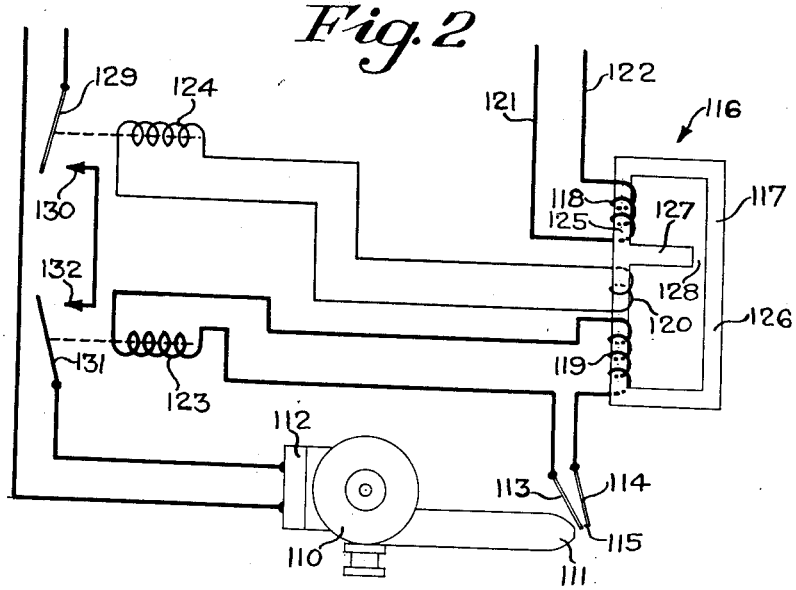
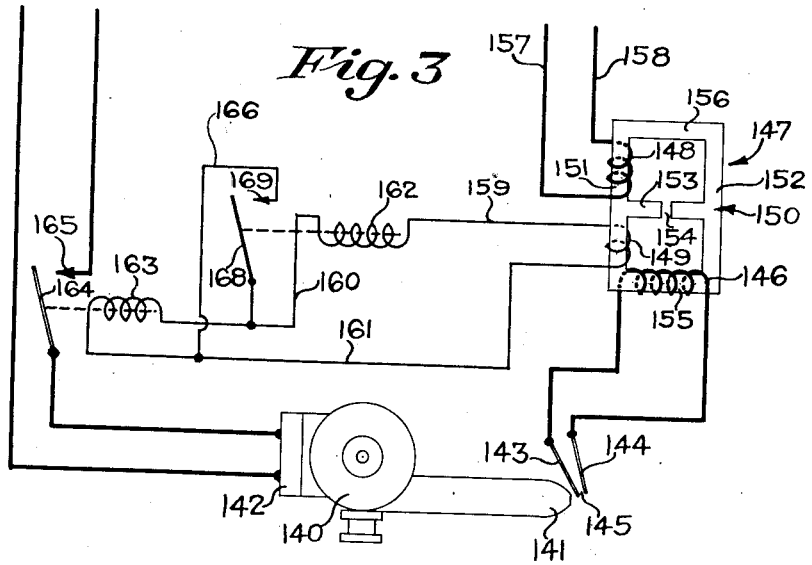

Patented Jan. 10, 1939

2,143,076

UNITED STATES PATENT OFFICE 2,143,076

FUEL COMBUSTION CONTROL SYSTEM

Allan M. Koerner, Minneapolis, Minn., assignor to Minneapolis-Honeywell Regulator Company, Minneapolis, Minn., a corporation of Delaware Application September 9, 1935, Serial No. 39,784

15 Claims. (Cl. 158—28)

My invention relates to a fuel combustion control system and, more particularly, to means for checking the condition of the spark employed to ignite the fuel.

In a fuel combustion system, such as an oil burner system, wherein the fuel is completely turned off at times, it is usual to provide some means for initially igniting the fuel supplied to the burner. Such means commonly takes the form of a high tension circuit including a spark gap, located adjacent to the point at which the fuel issues from the supply means. Since it is undesirable for fuel to be supplied to the burner until a proper spark occurs across said spark gap, various means have been devised for checking the condition of the spark and preventing the fuel supply motor from operating until a proper spark appears across said spark gap. Many of these devices have the disadvantage that they do not differentiate between a proper spark and a complete or partial short-circuit between the electrodes of the spark gap. It is important that such a differentiation be made since there is no spark at all in the case of a complete short-circuit, whereas with a partial short-circuit the spark is not of the proper character to ignite the fuel. Where devices have been devised which do differentiate between a proper spark and a complete or partial short-circuit between the electrodes such devices have had the disadvantage that they are dependent upon the use of one or more thermionic or other space discharge devices. Such devices are initially costly and moreover have the disadvantage that they have a limited life and must be periodically replaced.

An object of the present invention is to provide a fuel combustion control system having spark checking means associated with the operative by the same transformer as is employed to supply high voltage current for the ignition circuit.

A further object of this invention is to provide a fuel combustion system in which said spark checking means will control the action of a pair of switches, both of which must be in definite circuit controlling positions to permit the motor to operate and each of which is controlled by a different condition of the ignition circuit.

A further object of this invention is to provide a fuel combustion system in which the spark checking means will operate to close the motor circuit only upon the presence of a current in the ignition circuit of the value accompanying a proper spark and will not operate to close said motor circuit if the current is above or below said value.

Other objects of the invention will be apparent from the accompanying description and drawings, in which:

Fig. 1 is a schematic view of my fuel combustion control system embodying my spark checking system, and Figs. 2 and 3 are schematic views of modified forms of my spark checking system.

Referring to Fig. 1 of the drawings, a heating plant is designated by the reference numeral 10. This heating plant has associated therewith a flue 11 leading to a stack 12.

Associated with said heating plant is an electrically operated fuel feeding means 13, which feeds a suitable fuel through a nozzle 14, said fuel feeding device being operated by a motor, the terminal box of which is indicated by numeral 15.

The fuel issuing from said nozzle 14 is ignited by means of an ignition circuit comprising a pair of electrodes 16 and 17 spaced apart to provide a spark gap 18 therebetween. Electrodes 16 and 17 are supplied with high tension current by a transformer 19.

A thermostat 20 is located in the space whose temperature is to be controlled and controls the operation of my fuel combustion system. Said thermostat comprises a bimetallic element 21, having attached thereto a contact arm 22 carrying contacts 23 and 24 adapted to be engaged with contacts 25 and 26, respectively. Contacts 23 and 25 are spaced a shorter distance from each other than contacts 24 and 26, so that upon movement of contact arm in the direction of contacts 25 and 26, contacts 23 and 25 will be brought into engagement before contacts 24 and 26.

The thermostat directly controls the operation of a relay indicated generally by the reference numeral 28. Said relay comprises a relay coil 29 and a pair of switch arms 30 and 31. Said switch arms are biased to an open position and are adapted to be moved into engagement with contacts 32 and 33, respectively, upon energization of relay coil 29.

Said relay coil 29 is supplied with low voltage current by means of a step-down transformer 34. Said step-down transformer comprises a high voltage primary 35, a core 36 and a low voltage secondary 37. The primary 35 is connected through conductors 38 and 39 with line wires 40 and 41 through which high voltage power is obtained.

Controlling the flow of current to the relay 28 during the initial operation of the system is a thermal safety switch 42. Said switch is preferably of the type shown in the patent to Frederick S. Denison, No. 1,958,081, issued May 8, 1934. As shown in the drawings, this switch comprises two switch arms 43 and 44 held in contacting position by a bimetallic element 45. Associated with said bimetallic element is an electrically operated heater element 46. The flow of current through relay coil 29, during the initial operation of the system takes place through said heater element. If such flow continues sufficiently long, the heating element will furnish sufficient heat to bimetallic element 45 to cause the same to move to the right, out of engagement with switch arm 44, allowing switch arms 43 and 44 to separate. The switch is designed so that after said separation has taken place, the switch can be restored to its closed position only by a manual operation.

Located in the flue 11 is a stack switch designated generally by the reference character 47. Said stack switch is preferably of the form disclosed in the patent to Benjamin Cyr No. 1,768,892, issued July 1, 1930. This stack switch comprises a movable switch arm 48 adapted to be moved into engagement with a contact 49. A bimetallic element 50 is located in said flue and is adapted to move said switch arm into engagement with said contact upon the temperature in said flue rising sufficiently.

Stack switch 47 controls the operation of a second relay 51. Said relay 51 comprises a relay coil 52 operatively associated with switch arms 53 and 54. Switch arms 53 and 54 are so biased that they are in engagement with contacts 55 and 56, respectively, when said relay coil is deenergized. Upon energization of said coil, the switch arms are moved into engagement with contacts 57 and 58, respectively. Contacts 56 and 58 are of the over-lapping type so that switch arm 54 moves into engagement with contact 58 before moving out of engagement with contact 56.

Transformer 19 is a leakage transformer and comprises primary and secondary winding 59 and 60, auxiliary windings 61 and 62, and a core 63. Said core 63 is of magnetic material and has a plurality of legs 64, 65, 66 and 67. Connected to legs 64 and 66 is a further leg 68, comprising two portions separated by an air gap 69. Said leg affords a leakage path of relatively high reluctance. Due to the high reluctance of the leakage path, a large amount of flux will flow through the leg 67 and will energize secondary 60. The reluctance through the leakage path is so designed that if a normal spark occurs across spark gap 18, a certain amount of flux will flow through both said leakage path and said leg 67, thus energizing both auxiliary coils 61 and 62. Auxiliary coil 62 controls the action of a relay 70, comprising a relay coil 71 adapted to move a switch arm 72 into engagement with a contact 73. Switch arm 72 and contact 73 are in the motor circuit and control the operation of the motor. Auxiliary winding 61 is adapted to control a second relay 74, comprising relay coil 75 adapted to move a switch arm 76 into engagement with a contact 77, said last relay controlling the operation of the first mentioned relay by controlling the energizing circuit of the relay coil 71. Thus, in order for switch arm 72 to be in engagement with contact 73, it is necessary that both relay coils 71 and 75 be sufficiently energized. The transformer is so designed that when a proper spark occurs across the spark gap, both of said relay coils will be so energized.

Upon the temperature in the space dropping below a predetermined point, bimetallic element 21 will move contact arm 22 with its associated contacts in the direction of contacts 25 and 26. Since contacts 23 and 25 are more closely spaced, they will engage first. Engagement of these contacts does not, however, establish any energizing circuit. If the movement of switch arm 22 to the right continues, contact 24 will engage contact 26 with the result that the following energizing circuit is established: From secondary 37 through conductor 80, relay coil 29, conductor 81, conductor 82, heater element 46, conductor 83, conductor 84, switch arm 53, contact 55, conductor 85, contacts 26 and 24, contacts 23, 25, conductor 86, switch arms 43, 44, and conductor 87 back to secondary 37.

This energizing circuit will cause relay coil 29 to be energized with the result that switch arm 30 is moved into engagement with contact 32 and the following holding circuit is established: From secondary 37 through conductor 80, relay coil 29, conductor 81, conductor 82, heating element 46, conductor 93, conductor 88, switch arm 30, contact 32, conductor 90, bimetallic element 21, contacts 23 and 25, conductor 86, switch arms 43 and 44, and conductor 87 back to secondary 37. This holding circuit, it will be noted, does not depend upon engagement of contacts 24 and 26, nor engagement of switch arm 53 and contact 55. Thus, even though any of these parts should now separate, the relay coil 29 would remain energized. It will thus be seen that a slight vibration of contact arm 22 will not result in sudden starting and stopping of the heating plant.

The energization of relay coil 29 also results in the movement of switch arm 31 into engagement with contact 33 and the establishment of the following circuit: From line wire 40, through conductor 91, primary 59, conductor 92, contact 56, switch arm 54, conductor 93, conductor 94, switch arm 31, contact 33, and conductor 95 to the other line wire 41. This causes the primary of transformer 19 to be energized with the resultant energization of the ignition circuit. If the ignition apparatus functions in its proper manner, a spark will appear across spark gap 18 which spark will be of proper characteristics to ignite the fuel. If such is the case, the flow of flux through the transformer core 63 will be apportioned between legs 67 and leakage path 68 in such a manner that both relay coils 71 and 75 are energized. Under these conditions, switch arm 76 will be in engagement with contact 77 and switch arm 72 in engagement with contact 73. This will cause the following motor circuit to be established: From line wire 40, through conductor 96, through the motor, conductor 97, contact 73, switch arm 72, conductor 98, conductor 94, switch arm 31, contact 33, and conductor 95 to the line wire 41.

In the event that the spark occurring between electrodes 16 and 17 is not proper to cause combustion due to the fact that the electrodes are too closely spaced with a resulting substantial short-circuit between the electrodes, or at some other point in the circuit, the flow of current through secondary 60 will be very large. This large flow of current will set up a heavy counterflux which will oppose the flow of flux through the portion of the core on which the secondary is located. As a result, a greater proportion of flux will be forced through the higher reluctance leakage path 68 and a relatively small amount of flux will flow through leg 67. Under these conditions, the current induced in winding 62 will be insufficient to energize relay coil 71. This will result in switch arm 72 not being brought into engagement with contact 73 so that the previously traced motor circuit is not established.

If, on the other hand, the electrodes are spaced so far apart that no spark occurs therebetween or if for some other reason the ignition circuit is opened, no flow of current will take place through secondary 60. There will, then, be no counterflux to oppose the flow of flux through leg 67 and as a result very little flux will flow through the higher reluctance leakage path 68. The result of this will be that insufficient current is induced in winding 61 to energize relay coil 75 sufficiently to move switch arm 76 into engagement with contact 77. This will prevent any flow of current through relay coil 71 regardless of how much flux may flow through leg 67.

It will be seen that in either event, the motor circuit is not established with the result that fuel is not delivered through nozzle 14. In this manner, I prevent fuel being delivered under conditions in which ignition is not likely to take place, thus avoiding the danger caused by sudden ignition of accumulated fuel.

The establishment of the motor circuit causes fuel to be delivered through the nozzle 14. Since there is a proper spark between electrodes 16 and 17, combustion will ordinarily take place. The combustion of fuel results in hot gases passing through flue 11 to stack 12. The passage of these hot gases results in the heating of the bimetallic element 50 and the consequent movement of switch arm 48 into engagement with contact 49. Upon such movement taking place, the following circuit through relay coil 52 is established: From line wire 40, through conductor 99, contact 49, switch arm 48, conductor 100, relay coil 52, and conductor 101 to the other line wire 41.

The energization of relay coil 52 causes switch arm 53 to move out of engagement with contact 55 and into engagement with contact 57. This movement of switch arm 53 breaks the initial energizing circuit for relay coil 29, which is now of no utility, and establishes the following new holding circuit therefor: From secondary 37, through conductor 80, relay coil 29, conductor 81, conductor 102, contact 57, switch arm 53, conductor 84, conductor 88, switch arm 30, contact 32, conductor 90, bimetallic element 21, contacts 23 and 25, conductor 86, switch arms 43 and 44, and conductor 87 back to secondary 37. It will be noted that this new holding circuit does not include the heating element 46 and, in effect, constitutes a shunt across said heating element. Due to the high resistance of the heating element, a negligible amount of current will now flow through the same and it will cease to heat the bimetallic element 45 appreciably.

The energization of relay coil 52 also causes switch arm 54 to move out of engagement with contact 56 and into engagement with contact 58. The movement of switch arm 54 out of engagement with contact 56 results in the circuit to the primary of the ignition transformer being broken with the result that the ignition circuit is no longer energized. This causes the spark checking device to allow switch arm 72 to move out of engagement with switch arm 73 thus breaking the previously mentioned motor circuit. Before said switch arm 54 moves out of engagement with contact 56, however, it moves into engagement with contact 58 which is previously mentioned overlaps with contact 56. Upon the movement of switch arm 54 into engagement with contact 58, the following new motor circuit is established: From line wire 40, through conductor 96, through the motor, conductor 97, conductor 104, contact 58, switch arm 54, conductor 93, conductor 94, switch arm 31, contact 33, and conductor 95 to the other line wire 41. Since this new motor circuit is independent of switch arm 72 and is established before switch arm 72 is separated from contact 73, there is no interruption in the operation of the motor.

If combustion should not take place, stack switch 47 will remain open. This will result in relay coil 52 remaining deenergized and switch arm 53 remaining out of engagement with contact 57. Under these conditions, all the flow of current through relay coil 29 takes place through the first mentioned holding circuit and hence through heater element 46. This will result after a short period of time in bimetallic element 45 being heated sufficiently to move so far to the right that switch arms 43 and 44 are allowed to separate. The separation of these switch arms will break the circuit through the relay coil 29, allowing said coil to become deenergized and restoring the apparatus, with the exception of the switch, to its original position. Before the apparatus will again start up, it is necessary for switch 42 to be manually closed. This prevents the apparatus from repeatedly going through the same starting cycle when there is some defect which prevents combustion taking place.

If combustion should take place, but after a short period of time should be interrupted for some reason or other, hot gases will cease to pass up the flue 11. This will result in the cooling of bimetallic element 50 with the resultant opening of switch 47. This will cause relay coil 52 to be deenergized with the result that the new holding circuit is broken and the ignition circuit is once more energized. If conditions are suitable for combustion, combustion will once more take place and the apparatus will function in the same manner as previously outlined. If combustion does not take place immediately, switch 42 will act after a short period of time to open the circuit through relay 29 and restore the system to its safety position and prevent the apparatus from starting up again until switch 42 is manually closed.

It will be readily seen that my fuel combustion control system is entirely automatic under all normal circumstances and prevents the operation of the fuel feeding means under conditions in which combustion will not take place. It will further be seen that I have provided a spark checking device which will operate only when there is a proper spark and will not operate in the event of an open circuit or in the event of a short-circuit. My system moreover provides for an interruption of the operation of said fuel feeding means in the event of any contingency which prevents combustion from continuing.

In Fig. 2 I have illustrated a modified form of my spark checking device. Since the rest of the control system may be the same as that shown in Fig. 1, I have omitted all portions of said system except those directly associated with the spark checking device in order to simplify the description of the same. Referring to said figure, a fuel feeding means which corresponds with fuel feeding means 13 is designated by the reference numeral 110. This fuel feeding means feeds fuel to a nozzle 111 and comprises a motor, 75 the terminal box of which is designated by numeral 112. Electrodes 113 and 114 are spaced apart to provide a gap 115 therebetween and serve as a means for igniting the fuel issuing from nozzle 111.

Said electrodes are energized by means of a transformer 116. Said transformer 116 comprises a core 117 upon which is located a primary winding 118, a secondary winding 119, and an auxiliary winding 120. Primary 118 is connected through conductors 121 and 122 to a suitable source of electric power in the same manner as is primary 59 of the species shown in Fig. 1. Secondary 119 is connected to said electrodes 113 and 114, in series with a relay coil 123. Auxiliary winding 120 is connected to a second relay coil 124. Core 117 comprises legs 125 and 126 and a leakage path of relatively high reluctance made up of leg 127 and an air gap 128.

Relay coil 124 is associated with switch arm 129, which switch arm is adapted to engage contact 130. Relay coil 123 is associated with a switch arm 131 and is adapted to move the same into engagement with a contact 132. It will be noted that both switch arms 131 and 129 are in the motor circuit and the operation of the motor is dependent upon both of said switch arms being in engagement with their respective contacts.

The reluctance of leakage path 127 is of such value that if a proper spark occurs across the spark gap 115, the flux which flows through the portion of leg 125 on which the secondaries 119 and 120 are located will be just sufficient to maintain both relay coil 123 and relay coil 124 energized. In the event of a short-circuit condition in the ignition circuit to which secondary 119 is connected, an abnormally high current will flow through said relay coil 123 and through secondary 119. This large flow of current through secondary 119 opposes the flow of flux through the portion of leg 125 on which said secondary is located and causes the same to flow through the leakage path in spite of the higher reluctance of the same. This will result in winding 120 being subjected to less flux with the result that relay coil 124 will be deenergized, allowing switch arm 129 to move out of engagement with contact 130. In the event of an open circuit in the ignition circuit, there will be no flow of current through relay coil 123 and consequently this relay coil will be deenergized with the result that switch arm 131 moves out of engagement with contact 132. It will be seen that in the event of either of these two contingencies, the motor circuit will not be closed. It will thus be seen that as in my preferred form, the motor circuit is closed only when there is a flow of current to the ignition circuit of the magnitude accompanying a proper spark.

In Fig. 3, I have designated the fuel feeding means by the reference character 140, the nozzle thereof by numeral 141 and the terminal box of the motor by the numeral 142. The electrodes 143 and 144 are spaced apart to provide a spark gap 145 therebetween and are connected to a secondary 146 of a transformer 147.

Said transformer, in addition to said secondary 146, comprises a primary winding 148 and an auxiliary secondary winding 149 which windings are located on a core 150. Said core comprises legs 151 and 152 connected by legs 155 and 156 and a leakage path 153 comprising a leg 153. Said leakage path includes an air gap 154 which serves to increase the reluctance thereof. Primary 148 is connected through conductors 157 and 158 with a suitable source of power in the same manner as is primary 59 of Fig. 1.

The auxiliary secondary winding 149 is connected through conductors 159, 160 and 161 in series with relay coils 162 and 163. Relay coil 163 is associated with a switch arm 164 which is moved into engagement with a contact 165 upon energization of said relay coil. Switch arm 164 and contact 165 control the operation of a circuit through the motor in the same manner as switch arm 72 and contact 73 of Fig. 1. Connected between conductors 160 and 161 is a shunting circuit 166. Said shunting circuit is controlled by a switch comprising a switch arm 168 and a contact 169. Said switch arm 168 is adapted to be moved into engagement with contact 169 upon sufficient energization of relay coil 162. Relay coil 163 is energized sufficiently to cause switch arm 164 to move into engagement with contact 165 upon a flow of current therethrough which is much smaller than that needed to energize relay coil 162 sufficiently to cause switch arm 168 to move into engagement with contact 169.

If a proper spark occurs in the ignition circuit, the flux flow to the portion of leg 151 on which auxiliary winding 149 is located will induce sufficient current to flow in winding 149 to energize coil 163 sufficiently to move switch arm 164 into engagement with contact 165. This flow of current will not be sufficient, however, to energize relay coil 162 sufficiently to move switch arm 168 into engagement with contact 169. In the event, however, of some interruption in the ignition circuit so that the same is opened, the flux flow through the portion of the transformer on which winding 149 is located will increase to such a point that the current flow to the circuit energized by this winding will be sufficient to energize relay coil 162 to a point where it moves switch arm 168 into engagement with contact 169. This causes the shunt circuit 166 to be established with the result that a negligible amount of current flows through relay coil 163. This will cause said relay coil to be deenergized with the result that switch arm 164 separates from contact 165 thus opening the motor circuit. In the event of a short-circuit condition in the ignition circuit, the flow of current to secondary 146 will be so large that the greater part of the flux will be forced to flow through the leakage path 153. The result will be that insufficient flux will flow through the portion of the core on which winding 149 is located. This will result in the current flow through relay coil 163 being insufficient to energize the same sufficiently, with the result that switch arm 164 is not moved into engagement with contact 165. In this case also, a motor circuit is not established.

It will be seen that in all three species of my device, I have provided a spark checking device which will operate to prevent the motor circuit from becoming established unless a proper spark appears across the spark gap. In this way, a delivery of fuel to the burner is not effected until there is a spark in the spark gap which will cause combustion of said fuel. It will further be seen that I have avoided the use of any apparatus which has a limited life and which must periodically be replaced.

While I have shown certain specific embodiments of my invention for purposes of illustration, it will be understood that these are only for the purpose of illustration and that my invention is limited only by the scope of the appended claims.

I claim as my invention:

1. In combination, a first circuit including two electrodes spaced apart to provide a spark gap therebetween, a second circuit controlled by said first circuit, a transformer comprising a secondary winding connected in said first circuit and serving as the means for energizing the same to cause a spark discharge across said electrodes, and means including an auxiliary winding associated with said transformer and directly responsive to the flux flow in said transformer controlling the operation of said second circuit in accordance with the condition of the spark in said spark gap.

2. In combination, a high voltage circuit including a spark gap, a second circuit controlled by said first circuit, a transformer for energizing said high voltage circuit, said transformer comprising a core of magnetic material, a primary winding thereon, and a secondary winding connected in said high voltage circuit, said core having a portion constituting a leakage path around that portion of the core on which said secondary winding is located, an auxiliary winding on the portion of the core on which said secondary winding is located, a second auxiliary winding on that portion of the core which constitutes the leakage path, and a plurality of switches each controlled by one of said auxiliary windings, said switches being associated with said second circuit in such a manner that the energization of said second circuit is dependent upon both said switches being closed, the reluctance of said leakage path being such that when a current of the magnitude accompanying a normal spark flows in said high voltage circuit, sufficient flux will flow both in said leakage path and in said portion of the core on which said secondary is located to energize both of said windings sufficiently to cause them to close the respective switches with which they are associated.

3. In combination, a high voltage circuit including a spark gap, a second circuit, an electrically operated switch controlling said second circuit, a transformer for energizing said high voltage circuit, said transformer comprising a core of magnetic material, a primary winding thereon, and a secondary winding connected in said high voltage circuit, said core having a portion constituting a leakage path around that portion of the core on which said secondary winding is located, an auxiliary winding on the portion of the core on which said secondary winding is located, a second auxiliary winding on that portion of the core which constitutes the leakage path, one of said auxiliary windings being connected in a circuit with the actuating means of said electrically operated switch for controlling said second circuit, a second switch, means associated with the other of said auxiliary windings controlling the operation of said second switch, said second switch controlling the circuit connecting the actuating means of said first switch with its auxiliary winding, the reluctance of said leakage path being such that when a current of the magnitude accompanying a normal spark flows in said high voltage circuit, sufficient flux will flow in said leakage path and in said portion of the core on which said secondary winding is located to energize both of said auxiliary windings sufficiently to cause them to close the respective switches with which they are associated to cause said second circuit to be energized.

4. A high voltage circuit including a spark gap, a second circuit, a switch controlling said second circuit, electrically operated actuating mechanism for said switch, a source of power, a leakage transformer comprising a core of magnetic material, a primary winding connected to said source of power, and a secondary winding connected to said high voltage circuit, said core having a portion constituting a leakage path around the portion thereof on which the secondary winding is located, an auxiliary winding located on said core on the same portion as said secondary winding and connected in a circuit with the actuating mechanism for said switch, the reluctance of said leakage path being such that upon a flow of current in the high voltage circuit of the magnitude accompanying a proper spark, the current induced in the auxiliary winding will be sufficient to operate said switch, and means operative upon a decrease in current in said high voltage circuit below the magnitude accompanying a proper spark to shunt out said switch actuating mechanism.

5. In a fuel combustion system, electrically operated fuel feeding means, a high voltage circuit including a spark gap for igniting the fuel, a transformer comprising a core, a primary winding, and a secondary winding connected in said high voltage circuit, and means including an auxiliary winding on said transformer core operative to bring into operation said fuel feeding means when a spark of the proper characteristics to ignite said fuel occurs in said spark gap.

6. In a fuel combustion system, electrically operated fuel feeding means, a high voltage circuit including a spark gap for igniting the fuel, a leakage transformer comprising a core, a primary winding, and a secondary winding connected in said high voltage circuit, said core having a portion constituting a leakage path around that portion of the core on which the secondary winding is located permitting a variation in flux flow through said last named portion upon variation in current flow through said high voltage circuit, and means responsive to said flux flow operative to bring into operation said fuel feeding means only upon the flow in said high voltage circuit of a current of the magnitude accompanying a proper spark.

7. In a fuel combustion system, electrically operated fuel feeding means, a high voltage circuit including a spark gap for igniting the fuel, a leakage transformer comprising a core, a primary winding, and a secondary winding connected in said high voltage circuit, said core having a portion constituting a leakage path around that portion of the core on which the secondary winding is located permitting a variation in flux flow through said last named portion upon variation in current flow through said high voltage circuit, a plurality of switches in series controlling the operation of said fuel feeding means, and means associated with said transformer to hold both of said switches closed upon a flow of current in said high voltage circuit of the magnitude accompanying a proper spark, said means allowing one of said switches to open upon the current in said high voltage circuit becoming too high and allowing the other of said switches to open upon the current becoming too low.

8. In a fuel combustion system, electrically operated fuel feeding means, a high voltage circuit including a spark gap for igniting the fuel, a leakage transformer comprising a core, a primary winding, and a secondary winding connected in said high voltage circuit, said core having a portion constituting a leakage path around that portion of the core on which the secondary winding is located permitting a variation in flux flow through said last named portion upon variation in current flow through said high voltage circuit, a plurality of auxiliary windings on said core, a switch controlling said fuel feeding means and operated by means energized by one of said auxiliary windings through a connecting circuit, a second switch in said connecting circuit and operated by means energized by the other of said auxiliary windings, said windings being so located with respect to said leakage path that only upon a flow of current through said high voltage circuit of the magnitude accompanying a proper spark will both of said windings be energized sufficiently to hold their respective switches closed.

9. In a fuel combustion system, electrically operated fuel feeding means, a high voltage circuit including a spark gap for igniting the fuel, a leakage transformer comprising a core, a primary winding, and a secondary winding connected in said high voltage circuit, said core having a portion constituting a leakage path around that portion of the core on which the secondary winding is located permitting a variation in flux flow through said last named portion upon variation in current flow through said high voltage circuit, an auxiliary winding on that portion of the core on which the secondary winding is located, a second auxiliary winding on that portion of the core which constitutes the leakage path, a switch controlling said fuel feeding means and operated by one of said auxiliary windings through a connecting circuit, a second switch in said connecting circuit and operated by the other of said auxiliary windings, the reluctance of said leakage path being such that only upon a flow of current through said high voltage circuit of the magnitude accompanying a proper spark will both of said windings be energized sufficiently to hold their respective switches closed.

10. In a fuel combustion system, electrically operated fuel feeding means, a high voltage circuit including a spark gap for igniting the fuel, a leakage transformer comprising a core, a primary winding, and a secondary winding connected in said high voltage circuit, said core having a portion constituting a leakage path around that portion of the core on which the secondary winding is located permitting a variation in flux flow through said last named portion upon variation in current flow through said high voltage circuit, an auxiliary winding on that portion of the core on which the secondary winding is located, a plurality of switches in series controlling the operation of said fuel feeding means, means associated with said high voltage circuit controlling one of said switches, and means associated with said auxiliary winding controlling the other of said switches.

11. In a fuel combustion system, electrically operated fuel feeding means, a high voltage circuit including a spark gap for igniting the fuel, a leakage transformer comprising a core, a primary winding and a secondary winding connected in said high voltage circuit, said core having a portion constituting a leakage path around that portion of the core on which the secondary winding is located permitting a variation in flux flow through said last named portion upon variation in current flow through said high voltage circuit, an auxiliary winding on that portion of the core on which the secondary winding is located, a switch controlling the operation of said fuel feeding means having electrically operated actuating means, said actuating means being connected to said auxiliary winding and operated thereby, the reluctance of said leakage path being such that upon a flow of current in the high voltage circuit of the magnitude accompanying a proper spark to ignite the fuel, the current induced in the auxiliary winding will be sufficient to operate said switch, and means operative upon a decrease in current in said high voltage circuit below the magnitude accompanying a proper spark to shunt out said switch actuating means.

12. In a fuel combustion system, electrically operated fuel feeding means, a high voltage circuit including a spark gap for igniting the fuel, a transformer comprising a core, a primary winding, and a secondary winding connected in said high voltage circuit, an energizing circuit for said fuel feeding means, a switch controlling said circuit, electrically operated actuating means for said switch, and means including an auxiliary winding on said transformer for controlling the energization of said actuating means.

13. In combination, a high voltage circuit including a spark gap, a second circuit controlled by said first circuit, a transformer for energizing said high voltage circuit, said transformer comprising a core of magnetic material, a primary winding thereon, and a secondary winding connected in said high voltage circuit, said core having a portion constituting a leakage path around that portion of the core on which said secondary winding is located, an auxiliary winding on the portion of the core on which said secondary winding is located, and a pair of switches in series controlling said second circuit, an electrically operated actuating means for each of said switches, means associated with said high voltage circuit controlling the actuating means of one of said switches and effective to cause said actuating means to close said switch upon flow of sparking current through said high voltage circuit, and means associated with said auxiliary winding controlling the actuating means of the other of said switches, the reluctance of said leakage path being such that when a current of the magnitude accompanying a normal spark flows in said high voltage circuit, sufficient flux will flow in the portion of the core on which said secondary and auxiliary windings are located to cause said auxiliary winding to operate the switch with which it is associated.

14. A high voltage circuit including a spark gap, a second circuit, a switch controlling said second circuit, electrically operated actuating mechanism for said switch responsive to a given current flow to operate said switch, a source of power, a leakage transformer comprising a core of magnetic material, a primary winding connected to said source of power, and a secondary winding connected to said high voltage circuit, said core having a portion constituting a leakage path around the portion thereof on which the secondary winding is located, an auxiliary winding located on said core on the same portion as said secondary winding and connected in a circuit with the actuating mechanism for said switch, a shunting circuit connected across said circuit between said auxiliary winding and said switch actuating mechanism, a second switch controlling said shunting circuit, actuating mechanism for said second switch operated by a current flow larger than that required to operate the actuating means of said first mentioned switch, and means connecting the actuating mechanism for said second switch in series with the actuating mechanism for said first switch and with the auxiliary winding, the reluctance of the leakage path being such that upon a flow of current in the high voltage circuit of the magnitude accompanying a proper spark, the current induced in the auxiliary winding will be sufficient to maintain said first switch closed but insufficient to close said second switch controling the shunting circuit.

15. In a fuel combustion system; electrically operated fuel feeding means; a high voltage circuit including a spark gap for igniting the fuel; a transformer comprising a core, a primary winding, and a secondary winding connected in said high voltage circuit; an energizing circuit for said fuel feeding means including switch means controlling said circuit; an electromagnetic actuating means for said switch means; and means secured on said transformer core and controlling the energization of said actuating means, said last named means being directly responsive to the flux flow, independent of said primary and secondary windings, and operative to cause said electromagnetic actuating means to actuate said switch means to circuit closed position only when the flux assumes a value within the range accompanying a proper spark and has a value neither higher nor lower than this range.

ALLAN M. KOERNER.